(12) United States Patent
Baba et al.

(10) Patent No.: US 8,369,341 B2
(45) Date of Patent: Feb. 5, 2013

(54) MULTIPLEXING APPARATUS AND RECEIVING APPARATUS

(75) Inventors: Masayuki Baba, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1396 days.

(21) Appl. No.: 11/663,087

(22) PCT Filed: Jan. 18, 2005

(86) PCT No.: PCT/JP2005/000520
§ 371 (c)(1),
(2), (4) Date: Mar. 16, 2007

(87) PCT Pub. No.: WO2006/077621
PCT Pub. Date: Jul. 27, 2006

(65) Prior Publication Data
US 2007/0268927 A1 Nov. 22, 2007

(51) Int. Cl.
*H04L 12/28* (2006.01)
*H04L 12/56* (2006.01)
*H04J 3/02* (2006.01)

(52) U.S. Cl. ............... 370/395.42; 370/412; 370/538

(58) Field of Classification Search .................. None
See application file for complete search history.

(56) References Cited

U.S. PATENT DOCUMENTS

| | | | | |
|---|---|---|---|---|
| 5,461,619 A * | 10/1995 | Citta et al. | ..... | 370/468 |
| 6,418,140 B1 * | 7/2002 | Matsui | ..... | 370/378 |
| 6,438,139 B1 * | 8/2002 | Huang et al. | ..... | 370/468 |
| 6,532,242 B1 | 3/2003 | Tahara | | |
| 7,130,265 B1 * | 10/2006 | Sumida | ..... | 370/229 |

(Continued)

FOREIGN PATENT DOCUMENTS

| JP | 8-279835 A | 10/1996 |
|---|---|---|
| JP | 9-331524 A | 12/1997 |

(Continued)

OTHER PUBLICATIONS

Kazuhiro Matsuzaki et al., The Institute of Electronics, Information and Communication Engineers 2002 Nen Tsushin Society Taikai Koen Ronbunshu 2, 2002.9, pp. 515, B-6-127.

(Continued)

*Primary Examiner* — Chirag Shah
*Assistant Examiner* — Suk Jin Kang
(74) *Attorney, Agent, or Firm* — Birch, Stewart, Kolasch & Birch, LLP

(57) ABSTRACT

Provided are: a multiplexing apparatus for comparing priorities, selecting multiplexed data in an arbitrary output rate, and outputting the multiplexed data; and a receiving apparatus for combining data outputted from the multiplexing apparatus in a time sequential order, and thereafter outputting the data. A multiplexing apparatus (1) includes: a multiplexing buffer (2) that receives and temporarily stores encoded units to which respective priorities have been added; a multiplexing control unit (4) for sequentially selecting, based on the priorities and data amounts of the encoded units, encoded units each having respective data amounts which can be transmitted in a unit time and also having a higher priority than any other one; and a multiplexing unit (3) for sequentially selecting and multiplexing, under control of the multiplexing control part, encoded units, from among the encoded units stored in the multiplexing buffer, each of which has a respective data amount which can be transmitted in the unit time and also has a higher priority than any other one, and outputting the encoded units.

13 Claims, 11 Drawing Sheets

U.S. PATENT DOCUMENTS

| | | | |
|---|---|---|---|
| 7,248,586 B1* | 7/2007 | Hughes et al. | 370/394 |
| 2001/0040889 A1 | 11/2001 | Matsuzaki et al. | |
| 2001/0055318 A1* | 12/2001 | Obata et al. | 370/474 |
| 2002/0085592 A1* | 7/2002 | Ono et al. | 370/535 |
| 2002/0146023 A1* | 10/2002 | Myers | 370/412 |
| 2003/0112813 A1* | 6/2003 | Hara | 370/412 |
| 2003/0133465 A1* | 7/2003 | Alfano | 370/412 |
| 2003/0174774 A1* | 9/2003 | Mock et al. | 375/240.11 |
| 2003/0175011 A1* | 9/2003 | Nagai et al. | 386/52 |
| 2003/0214949 A1* | 11/2003 | Shaikli | 370/394 |
| 2003/0236904 A1* | 12/2003 | Walpole et al. | 709/231 |
| 2004/0048587 A1* | 3/2004 | Diao et al. | 455/127.1 |
| 2005/0105563 A1* | 5/2005 | Suzuki et al. | 370/535 |
| 2005/0177874 A1* | 8/2005 | Suzuki et al. | 726/26 |
| 2005/0286487 A1* | 12/2005 | Chitrapu | 370/351 |
| 2006/0072578 A1* | 4/2006 | Alfano | 370/394 |
| 2007/0081558 A1* | 4/2007 | Shaikli | 370/474 |
| 2009/0028189 A1* | 1/2009 | Kato et al. | 370/476 |

FOREIGN PATENT DOCUMENTS

| | | | |
|---|---|---|---|
| JP | 10-75223 A | | 3/1998 |
| JP | 2000-209177 | * | 7/2000 |
| JP | 2000-209177 A | | 7/2000 |
| JP | 2001-326617 A | | 11/2001 |
| JP | 2002-16574 A | | 1/2002 |

OTHER PUBLICATIONS

Kazuhiro Matsuzaki et al., The Institute of Electronics, Information and Communication Engineers 2003 Nen Tsushin Society Taikai Koen Ronbunshu 2, 2003.9, pp. 1, B-6-1.

* cited by examiner

MULTIPLEXING APPARATUS AND RECEIVING APPARATUS

TECHNICAL FIELD

The present invention relates to a multiplexing apparatus for selecting inputted encoded units in order of priority and for multiplexing the selected encoded units to output the multiplexed encoded data, and to a receiving apparatus for synthesizing multiplexed data outputted from the multiplexing apparatus with each other in a time sequential manner to thereafter output the synthesized data.

BACKGROUND ART

In a conventional multiplexing apparatus, priorities in multiplexing operations are determined based upon values obtained by weighting delay times occurred in multiplexing buffers in accordance with each of media sorts, and encoded units are selected from buffers having higher priorities so as to multiplex the selected encoded units with each other (refer to, for instance, Patent Document 1).

In this type of conventional multiplexing apparatus, only the priorities among the media are merely considered, so that the priority cannot be changed for each of the encoded units within the same media. In particular, in such a case that there are an important portion and a less important portion within the media, such a function capable of applying a priority with respect to each of the encoded units is required.

On the other hand, there is another multiplexing apparatus that while a priority is applied in the unit of an encoded unit, only such an encoded unit having the highest priority is transmitted (refer to, for instance, Patent Document 2).

However, in this type of multiplexing apparatus, although the priority is applied to each of the encoded units, permission/non-permission of a transmission is determined by comparing encoded units of the same timing with each other. As a result, even when encoded units having a plurality of high priorities are collected at the same timing, only one encoded unit may be merely outputted. Thus, in order to realize an effective multiplexing control operation, such a function is required by which encoded units having high priorities are outputted even if the encoded units are delayed in some degree.

Patent Document 1: JP 2000-209177 A
Patent Document 2: JP 08-279835 A

DISCLOSURE OF THE INVENTION

Problems to be Solved by the Invention

The conventional multiplexing apparatus owns a problem as follows. That is, although the priority is applied to each of the encoded units, since the encoded units of the same timing are compared with each other, encoded units containing such encoded units preceding/succeeding to the relevant encoded unit cannot be compared with each other, so that the encoded unit having the higher priority is not always selected in the long run.

Further, in the conventional multiplexing apparatus, such a selecting method for outputting 1 data of 1 timing is employed. Accordingly, the conventional multiplexing apparatus owns another problem that the multiplexed data cannot be selected in such an arbitrary output rate that 3 data are outputted at 5 timing.

The present invention has been made to solve the above-explained problems, and therefore has an object to provide a multiplexing apparatus capable of comparing priorities with each other within the same media, and capable of selecting multiplexed data in an arbitrary output rate to output the selected multiplexed data, and also to provide a receiving apparatus for synthesizing data outputted from the multiplexing apparatus with each other in a time sequential manner to output the synthesized data.

Means for Solving the Problems

A multiplexing apparatus in accordance with the present invention includes: multiplexing buffer means for inputting thereinto encoded units to which priorities have been added to temporarily store thereinto the inputted encoded units; multiplexing control means for selecting encoded units which have data amounts which can be transmitted within a unit time in order of priority based upon both the priorities and a data amount of the encoded units; and multiplexing means for selecting encoded units which have data amount which can be transmitted within the unit time in order of priority from the encoded units stored in the multiplexing buffering means based upon the control from the multiplexing control means, and for multiplexing the selected encoded units with each other to output the multiplexed encoded unit.

Further, a receiving apparatus in accordance with the present invention includes: receiving means for receiving encoded unit data from a plurality of paths; and synthesizing output means for rearraying the plurality of encoded units received by the receiving means in an original order of time instants to output the rearrayed encoded units.

Effects of the Invention

In accordance with the present invention, it is possible to provide the multiplexing apparatus capable of comparing the priorities with each other and capable of selecting the multiplexed data in the arbitrary output rate to output the selected multiplexed data, and also possible to provide the receiving apparatus for synthesizing the data outputted from the multiplexing apparatus with each other in the time sequential manner to output the synthesized data.

BEST MODE FOR CARRYING OUT THE INVENTION

Embodiment 1

Figure 1:
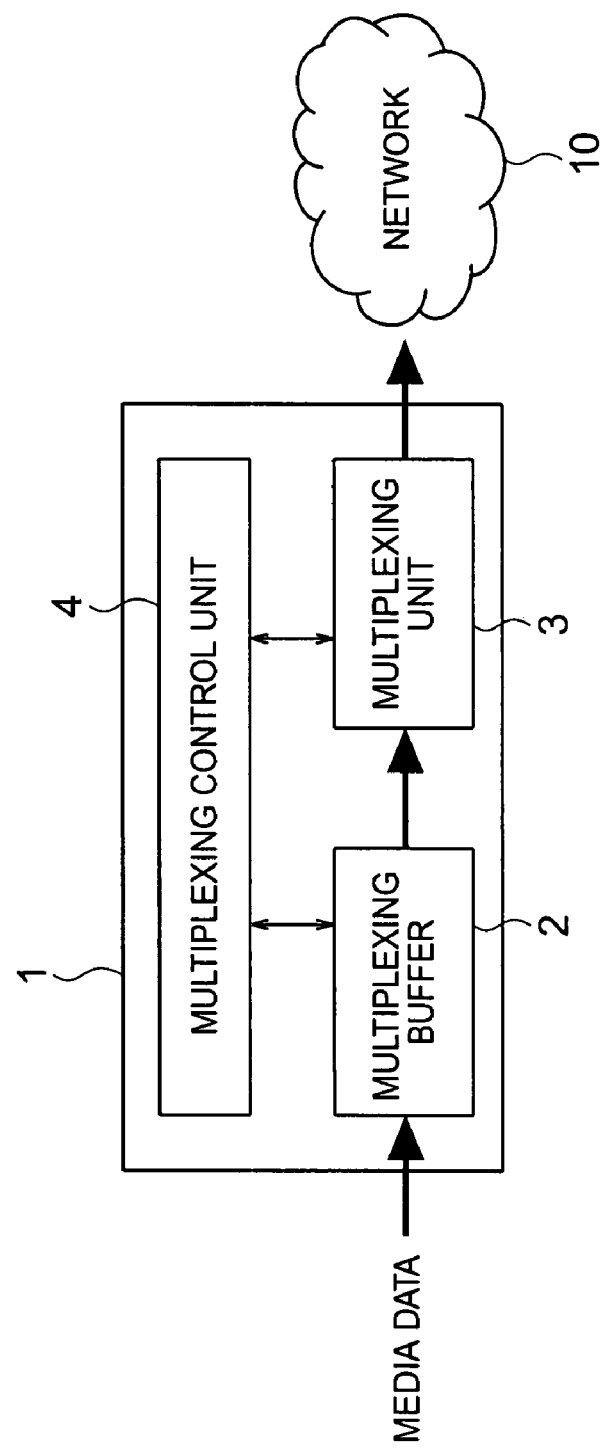
FIG. 1 is a block diagram indicating a configuration of a multiplexing apparatus according to Embodiment 1 of the present invention.

FIG. 1 is a block diagram showing a configuration of a multiplexing apparatus according to Embodiment 1 of the present invention. In FIG. 1, the multiplexing apparatus 1 acquires media data from an external unit, and multiplexes the acquired media data to output the multiplexed media data to a network 10. A multiplexing buffer 2 provided in the multiplexing apparatus 1 temporarily stores thereinto the externally transferred media data before being multiplexed. A multiplexing unit 3 selects media data which should be multiplexed from the encoded media data in the multiplexing buffer 2, and then, multiplexes the selected media data to output the multiplexed media data to the network 10. A multiplexing control unit 4 determines data which should be multiplexed based upon a priority of media data within the multiplexing buffer 2, and notifies this instruction to the multiplexing unit 3.

Next, operations will be explained. Firstly, the multiplexing apparatus 1 acquires a media data stream from the external unit, and temporarily stores the acquired media data stream to the multiplexing buffer 2. At this time, while the media data stream is constituted by a plurality of encoded units, priorities for multiplexing operations have been applied to the respective encoded units. The multiplexing control unit 4 selects such encoded units from the multiplexing buffer 2 in a certain unit time period in order of priority, while data amounts of these selected encoded units can be transmitted within the unit time. Then, the multiplexing control unit 4 notifies this information to the multiplexing unit 3. In the multiplexing unit 3, an encoded unit instructed from the multiplexing control unit 4 is outputted to the network 10. At this time, such encoded units stored in the multiplexing buffer 2 which are not selected are discarded.

As previously explained, the encoded units whose data amounts are equal to the output rate are selected from the encoded units which have been acquired within the certain unit time in order of priority, and then, the selected encoded data are transmitted. As a result, the encoded units having the high priorities can be transmitted.

Figure 2:
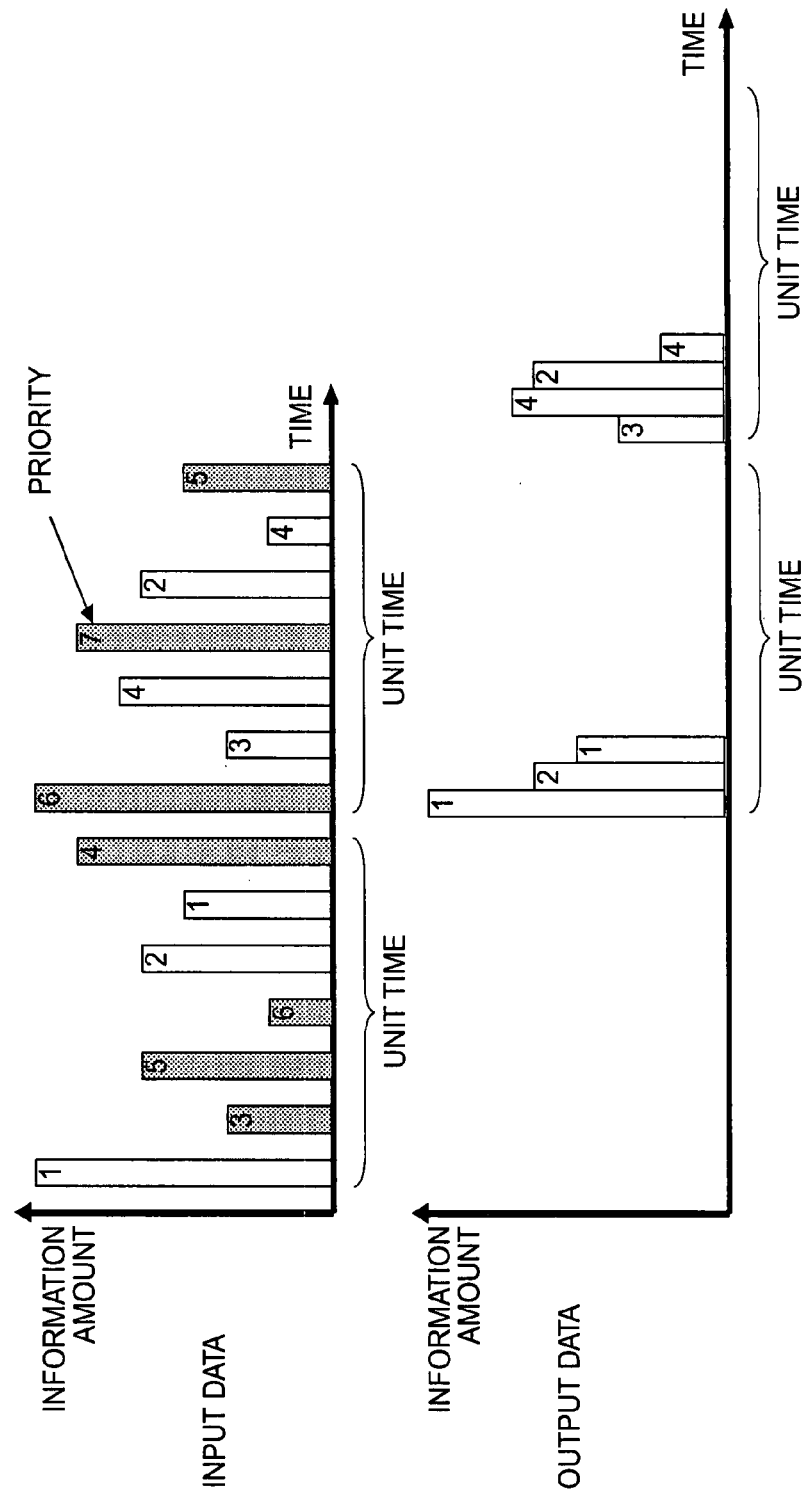
FIG. 2 is a diagram representing an example of a multiplexing control method according to Embodiment 1 of the present invention, namely indicating input data and output data.

FIG. 2 is a diagram representing input data and output data indicative of an example of a multiplexing control method according to Embodiment 1. As to input media data stream from the external unit shown in FIG. 2, a priority is applied from each of encoded units, and the input data own information amounts different from each other. These input data are once stored in the multiplexing buffer 2. The multiplexing control unit 4 selects such encoded units having high priorities from the encoded units stored in the multiplexing buffer 3 after a unit time has elapsed (in this drawing, time corresponding to 7 units to which priorities have been added), while the selected encoded units own such information amounts which can be transmitted. In FIG. 2, encoded units which are not meshed are selected. This information is notified from the multiplexing control unit 4 to the multiplexing unit 3. As shown in FIG. 2, the multiplexing control unit 3 outputs the data having the priorities 1, 2, and 1. At this time, the data having the priorities 3, 5, 6, and 4, which have not been selected, are discarded.

Thereafter, input data are continuously stored in the multiplexing buffer 2, and when the unit time has again passed, the multiplexing control unit 4 selects encoded units having high priorities, and having such data amounts which can be transmitted, and then, notifies the selected information to the multiplexing unit 3. In the multiplexing unit 3, the data are transmitted based upon this information.

As previously described, in the multiplexing apparatus 1, since the priorities of all of the encoded units within the unit time are compared with each other, only such encoded units having the high priorities can be outputted within the unit time.

Also, a total information amount of the encoded units which are selected within the unit time can be arbitrarily set, so that the total information amount can be fitted to a desirable output rate.

Embodiment 2

While one sort of media data is to be inputted in Embodiment 1 explained above, Embodiment 2 indicates an example for inputting a plurality of sorts of media data.

Figure 3:
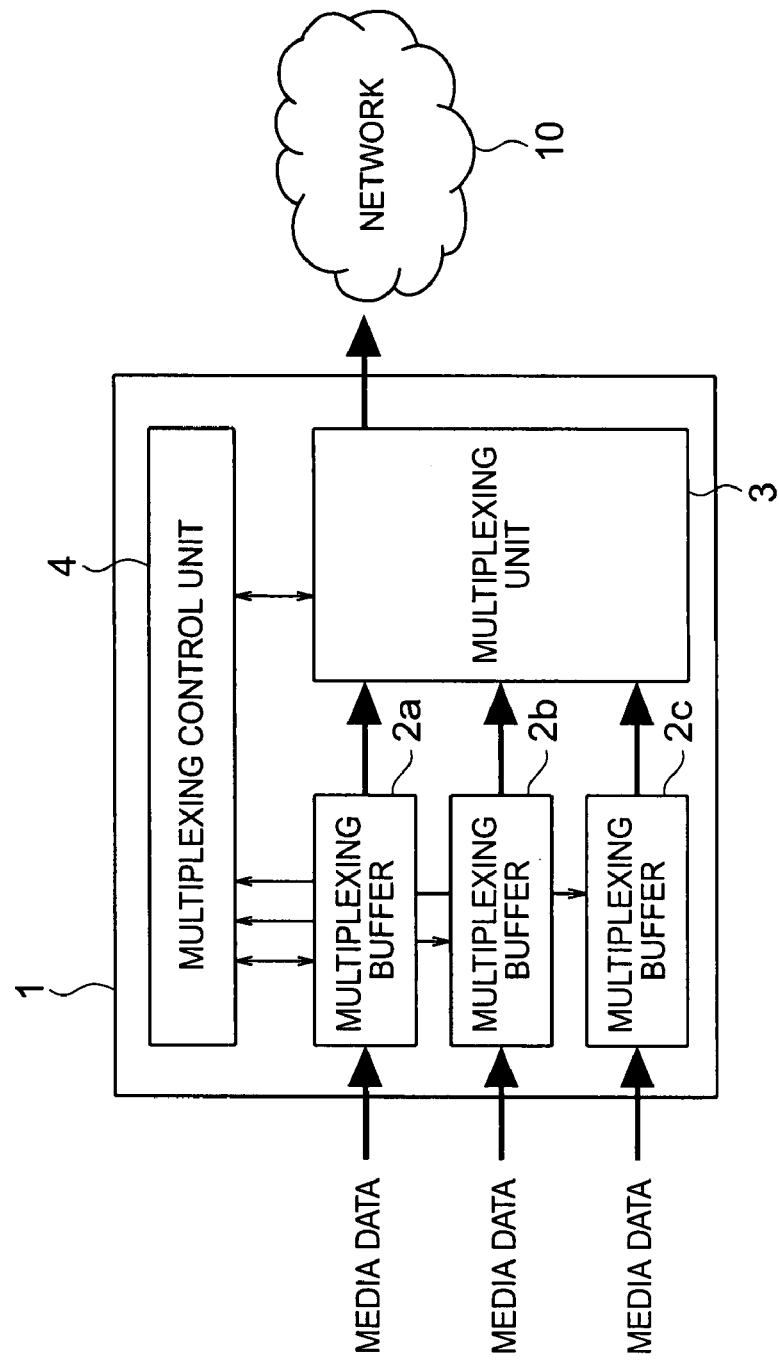
FIG. 3 is a block diagram indicating a configuration of a multiplexing apparatus according to Embodiment 2 of the present invention.

FIG. 3 is a block diagram showing a configuration of a multiplexing apparatus according to Embodiment 2 of the present invention. In FIG. 3, the multiplexing apparatus 1 is provided with a plurality of multiplexing buffers 2a to 2c, corresponding to sorts of media data. The plurality of multiplexing buffers 2a to 2c separately store thereinto media data which are entered from an external unit. The multiplexing unit 3 selects encoded units from encoded units stored in the plurality of multiplexing buffers 2a to 2c in order of priority under control of the multiplexing control unit 4, and then, multiplexes the selected encoded data to output the multiplex encoded data to the network 10. The selected encoded units own such data amounts that these encoded units can be transmitted within a unit time. Since other configurations of the multiplexing apparatus 1 are similar to these of Embodiment 1, these similar configurations are omitted. It should be noted that although a total number of the multiplexing buffers is three in the configuration shown in FIG. 3, any other quantities may be employed.

Next, operations will be described. Three sorts of media data are inputted to the multiplexing buffers 2a to 2c, and are temporarily stored in the respective multiplexing buffers 2a to 2c. At this time, while the media data stream is constituted by a plurality of encoded units, priorities for multiplexing operations have been applied to the respective encoded units. The multiplexing control unit 4 selects such encoded units from the multiplexing buffers 2a to 2c in a certain unit time period in order of priority, while data amounts of these selected encoded units can be transmitted within the unit time. Then, the multiplexing control unit 4 notifies this information to the multiplexing unit 3. In the multiplexing unit 3, an encoded unit instructed from the multiplexing control unit 4 is outputted to the network 10. At this time, such encoded units stored in the multiplexing buffer 2 which have not been selected are discarded.

Figure 4:
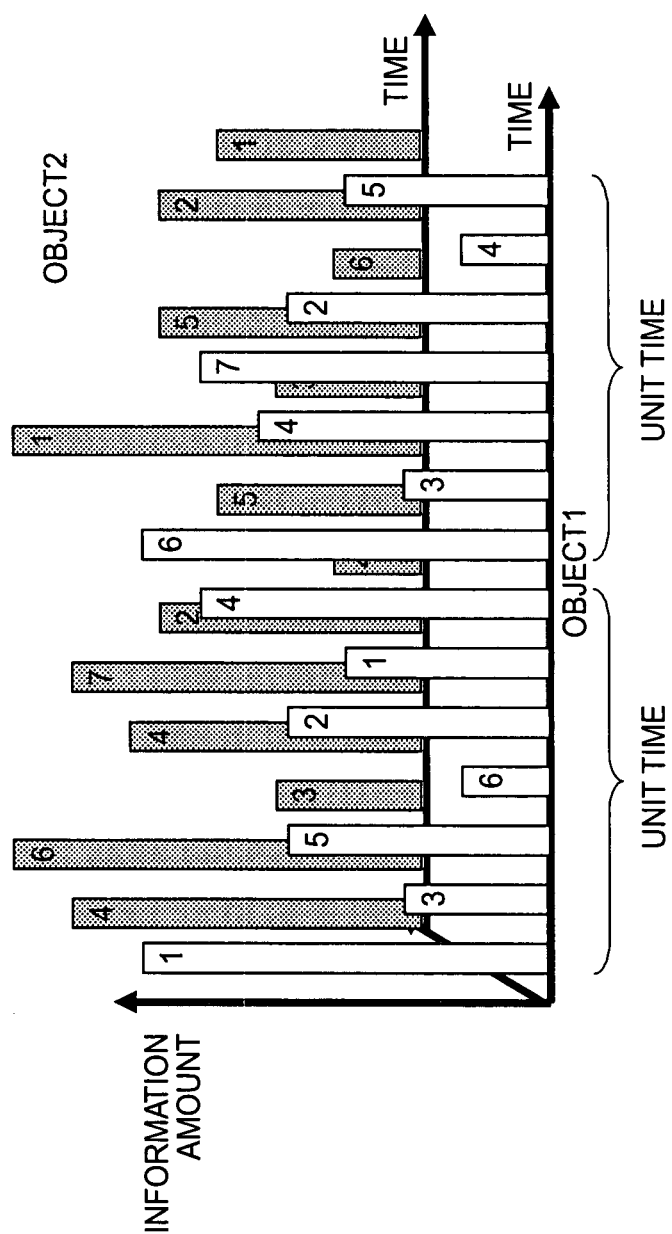
FIG. 4 is a diagram representing an example of a multiplexing control method according to Embodiment 2 of the present invention.

FIG. 4 is a diagram indicating an example of a multiplexing control method according to Embodiment 2. As indicated in FIG. 4, two sorts of input media data streams (object 1 and object 2) inputted from the external unit own different information amounts from each other, while a priority is applied to each of these encoded units. These input data are once stored in the multiplexing buffers 2a and 2b. The multiplexing control unit 4 selects such encoded units having high priorities from the encoded units stored in the multiplexing buffers 2a and 2b after a unit time has elapsed (in FIG. 4, time corresponding to 7 units), while the selected encoded units own such information amounts which can be transmitted. At this time, since the encoded units to be transmitted are selected based upon only the priorities, there are some possibilities that deviation may occur in the objects to be selected. However, since the above-explained selection is made, units having higher priorities can be selected. This information is notified from the multiplexing control unit 4 to the multiplexing unit 3, and then, the multiplexing control unit 3 transmits the encoded units which have been selected and own the higher priorities in the next unit time. At this time, the encoded units which have not been selected are discarded.

When selected encoded units having high priorities are transmitted by the multiplexing unit 3, there are some possibilities that header information for communication purposes may be applied thereto in accordance with a communication protocol, or a multiplexing protocol may be alternatively used so as to multiplex media. For instance, if a multiplexing operation is performed in accordance with the MPEG-2 system (ISO/IEC13818-1), then priorities are applied to the respective objects in the unit of an access unit, and a judgment is made of whether or not the multiplexing operation is allowed every access unit. Then, the selected access unit is PES (Packetized Elementary Stream)-processed, and TS (Transport Stream)-processed, and then, the processed access unit is multiplexed with other objects, and the resultant object is transmitted.

As previously described, the encoded units which have been acquired within a certain unit time are selected in order of priority, whose data amounts are equal to the output rate, and then, the selected encoded units having the high priorities are transmitted. As a result, only the encoded units merely having the high priorities can be multiplexed with each other irrespective of the sorts of media and the reception time instants, and the multiplexed encoded units can be transmitted.

As previously explained, since the plurality of multiplexing buffers are provided in the multiplexing apparatus 1, the plurality of sorts of media data can be multiplexed with each other to output the multiplexed media data.

Embodiment 3

In Embodiments 1 and 2 explained above, the multiplexing output information amount within the unit time has been correctly limited, whereas Embodiment 3 explains such an example that the multiplexing output information amount can be increased/decreased in some degree.

Figure 5:
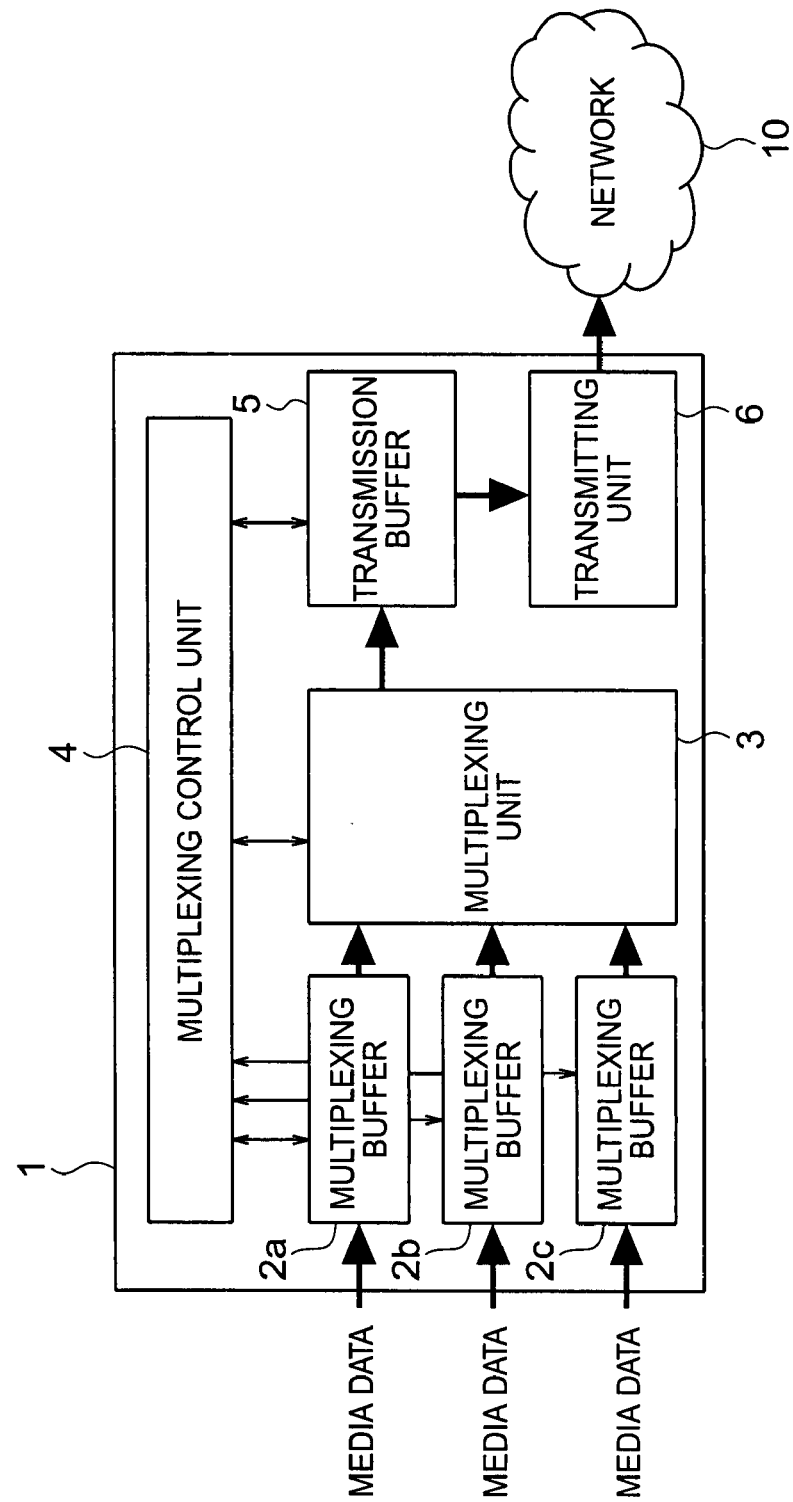
FIG. 5 is a block diagram indicating a configuration of a multiplexing apparatus according to Embodiments 3 and 4 of the present invention.

FIG. 5 is a block diagram showing a configuration of a multiplexing apparatus according to Embodiment 3 of the present invention. The multiplexing apparatus 1 according to Embodiment 3 indicated in FIG. 5 is further equipped with a transmission buffer 5 and a transmitting unit 6 in addition to the configuration of Embodiment 2 shown in FIG. 3. The transmission buffer 5 temporarily stores thereinto an output of the multiplexing unit 3. The transmitting unit 6 transmits multiplexed data stored in the transmission buffer 5 in correspondence with a transmission rate. Since other configurations of the multiplexing apparatus 1 of Embodiment 3 are similar to the configurations of Embodiment 2 shown in FIG. 3, explanations thereof are omitted.

Next, operations will be described. 3 sorts of media data are inputted to the multiplexing buffers 2a to 2c, and are temporarily stored in the respective multiplexing buffers 2a to 2c. At this time, while the media data stream is constituted by a plurality of encoded units, priorities for multiplexing operations have been applied to the respective encoded units. The multiplexing control unit 4 selects such encoded units from the multiplexing buffers 2a to 2c in a certain unit time period in order of priority, while data amounts of these selected encoded units can be transmitted within the unit time. Then, the multiplexing control unit 4 notifies this information to the multiplexing unit 3. In the multiplexing unit 3, an encoded unit instructed from the multiplexing control unit 4 is outputted to the transmission buffer 5. At this time, such encoded units stored in the multiplexing buffer 2 which have not been selected are discarded. In the transmitting unit 6, the encoded units stored in the transmission buffer 5 are transmitted to the network 10 in correspondence with the transmission rate.

In the multiplexing control unit 4, when an amount of data which can be transmitted within the unit time is recognized, a remaining amount is employed in the transmission buffer 5. Since a difference between a data amount outputted by the multiplexing unit 3 and a data amount which is actually transmitted by the transmitting unit 6 appears in the buffer remaining amount of the transmission buffer 5, the multiplexing control unit 4 determines an amount of data which is selected from the multiplexing buffer 2 in such a manner that the buffer remaining amount of the transmission buffer 5 becomes a data amount which can be transmitted by the transmitting unit 6 within the unit time.

When the multiplexing control unit 4 selects encoded units to be transmitted, since information amounts of the respective encoded units are varied, a total data amount of the selected encoded units is not always made coincident with the data amount which can be transmitted by the transmitting unit 6 within the unit time. As a consequence, such a data amount is stored in the transmission buffer 5, which exceeds the data amount which can be transmitted within the unit time by the transmitting unit 6, so that the transmitting unit 6 can continuously perform the data transmission in a stable rate, and at the same time, the total information amount of the encoded units within the unit time, which is selected by the multiplexing control unit 4, can be increased and decreased in some degree.

Figure 6:
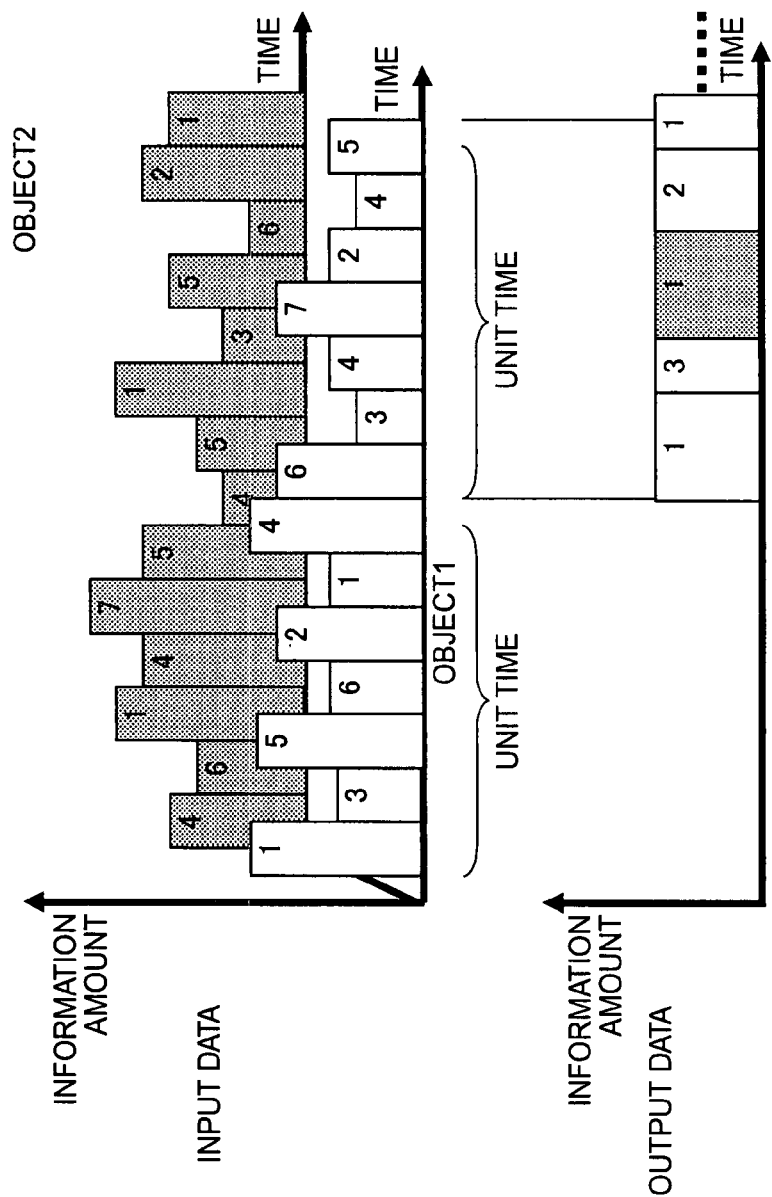
FIG. 6 is a diagram representing an example of a multiplexing control method according to Embodiment 3 of the present invention, namely indicating input data and output data.

FIG. 6 is a diagram representing input data and output data indicative of an example of a multiplexing control method according to Embodiment 3. As indicated in FIG. 6, two sorts of input media data streams (object 1 and object 2) inputted from the external unit own different information amounts from each other, while a priority is applied to each of these encoded units. These input data are once stored in the multiplexing buffers 2a and 2b. The multiplexing control unit 4 selects such encoded units having higher priorities from the encoded units stored in the multiplexing buffers 2a and 2b after a unit time has elapsed (in FIG. 6, time corresponding to 7 units), while the selected encoded units own such information amounts which can be transmitted. In FIG. 6, the encoded units whose priorities are 1, 2, 3 are selected, and then, the selected encoded units are outputted by the transmitting unit 6 by setting the output rate to a constant rate. At this time, as seen from the last encoded unit having the priority of "1", even when the encoded unit having the priority of "1" cannot be completely transmitted within the unit time, by selecting a slightly small amount of data in the next unit time, the multiplexing operation can be continuously carried out in the constant output rate.

As previously explained, since the transmission buffer 5 is provided, the encoded units can be selected, while the total information amount of the encoded units selected within the unit time is fluctuated.

In order that data is continuously transmitted from the transmitting unit 6 in a constant rate, the data whose amount is equal to the transmission data amount per unit time must be stored in the transmission buffer 5. In order that the total data amount of the encoded units selected by the multiplexing control unit 4 can be increased and decreased in some degree, while such data whose amount is larger than, or equal to the transmission amount per unit time have been continuously stored in the transmission buffer 5, namely, data whose amount is N (N is a real number larger than 1) times larger than the data transmission amount have been stored, the multiplexing control unit 4 controls the data transmitting operation in such a manner that the remaining amount of the transmission buffer 5 is in the vicinity of a value obtained by multiplying the unit time transmission amount by N.

As previously explained by increasing the initial buffer remaining amount, even when the total information amount of the encoded units which are temporarily selected becomes small, the data can be continuously transmitted at least in a constant rate. For example, if a certain priority is defined as a threshold value so as to select data, then the total information amount of the encoded units becomes slightly smaller than the desirable total data amount, whereas if a priority subsequent to the first-mentioned priority is defined as the threshold value, then the total information amount of the encoded units considerably exceeds the desirable total data amount, even when a total data amount becomes slightly insufficient, the data transmission amount can be approximated to the desirable data amount.

As previously explained, since the multiplexing control unit controls the data transmitting operation in such a manner that the remaining amount of the transmission buffer is in the vicinity of a value obtained by multiplying the unit time transmission amount by N, even when the total information amount of the encoded units to be transmitted temporarily becomes small, an occurrence of an under flow can be prevented.

Also, since the transmission buffer 5 is provided, the total data amount of the encoded units selected by the multiplexing control unit 4 can be increased and decreased in some degree. On the other hand, a threshold value (lowest priority to be selected) of the priorities of the encoded units selected by the multiplexing control unit 4 depends upon the encoded units contained in this unit time.

As a consequence, a threshold value of a priority is changed for each of the unit times. In order to continuously transmit encoded units having high priorities under stable condition, it is preferable not to largely change the threshold values of the priorities. As a consequence, when the multiplexing control unit 4 selects the encoded units, the priorities thereof are not largely changed. In this case, even when the total data amount of the encoded units to be selected is increased and decreased in some degree, these increased/decreased total data amounts are accepted as an allowable range. As a result, the threshold values of the priorities may become stable.

As previously explained, the multiplexing control operation is carried out in such a manner that the threshold values of the priorities become stable, so that only the encoded units having the high priorities can be transmitted under stable condition.

Embodiment 4

In Embodiments 1, 2, and 3 explained above, the multiplexing control operations have been carried out every unit time. In Embodiment 4, such an example is indicated that a multiplexing control operation is carried out in a further short time period than the unit time.

Since a basic configuration of a multiplexing apparatus according to Embodiment 4 is similar to that of Embodiment 3 shown in FIG. 5, explanations thereof are omitted. It should be noted that in Embodiment 4, a multiplexing control unit 4 provisionally selects encoded units every 1/M (M is an integer larger than, or equal to 1) unit time, which have been received in multiplexing buffers 2*a* to 2*c* within a unit time based upon both priorities and a data amount of the encoded units in order of priority in such a manner that a buffer remaining amount of a transmission buffer 5 is in the vicinity of a certain threshold value, and the multiplexing control unit 4 outputs only provisionally selected encoded units which are contained in the oldest 1/M unit time within the unit time to the transmission buffer 5.

Next, operations will be described. Three sorts of media data are inputted to the multiplexing buffers 2*a* to 2*c*, and are temporarily stored in the respective multiplexing buffers 2. At this time, while the media data stream is constituted by a plurality of encoded units, priorities for multiplexing operations have been applied to the respective encoded units. The multiplexing control unit 4 provisionally selects encoded units which have data amount which can be transmitted within the unit time, or encoded units whose data amount is equal to a threshold value of the transmission buffer 5 from the multiplexing buffers 2*a* to 2*c* in order of priority. Then, the multiplexing control unit 4 notifies to the multiplexing unit 3, such encoded units which have been provisionally selected and have been contained within the oldest 1/M unit time within the unit time. In the multiplexing unit 3, an encoded unit instructed from the multiplexing control unit 4 is outputted to the transmission buffer 5. At this time, such encoded units stored in the multiplexing buffer 2 which have not been selected within the oldest 1/M unit time of the unit time are discarded. In the transmission unit 6, the encoded units stored in the transmission buffer 5 are transmitted to the network 10 in correspondence with the transmission rate.

Figure 7:
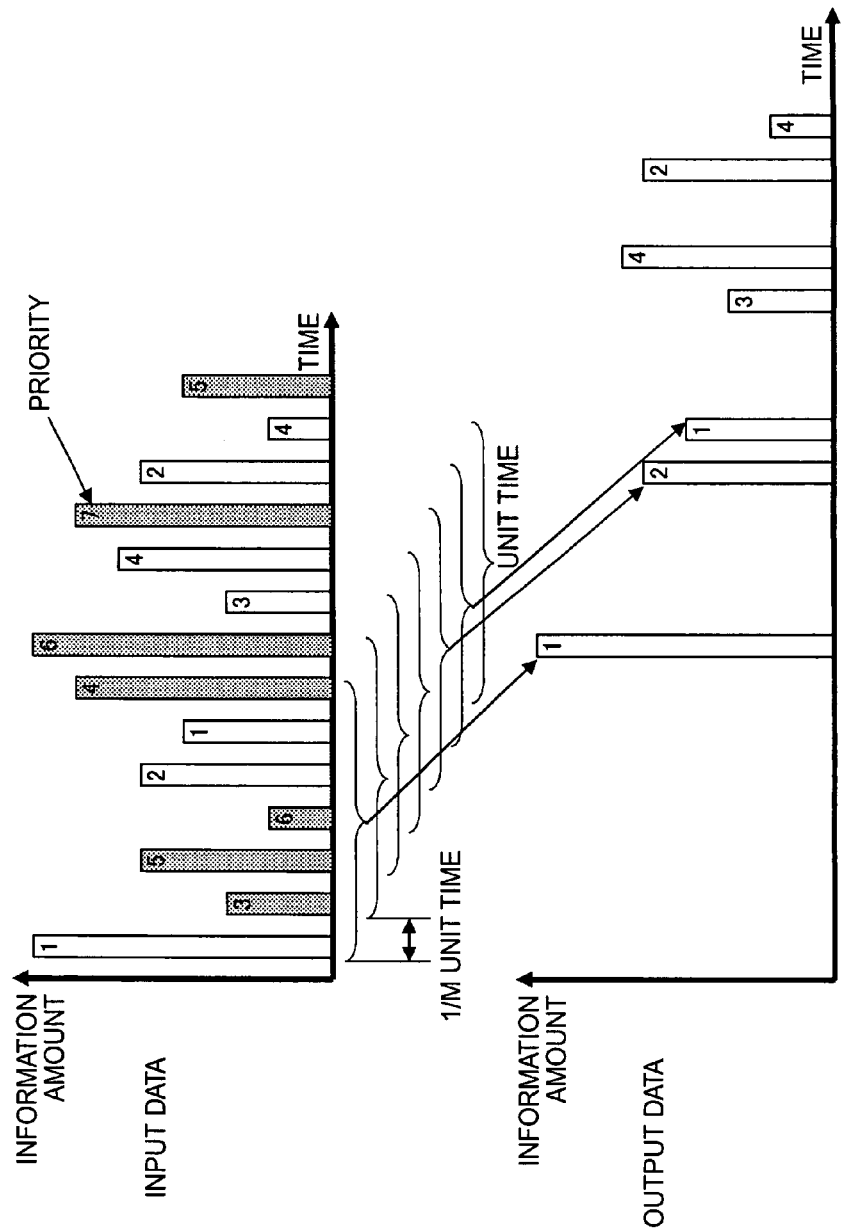
FIG. 7 is a diagram representing an example of a multiplexing control method according to Embodiment 4 of the present invention, namely indicating input data and output data.

FIG. 7 is a diagram representing input data and output data indicative of an example of a multiplexing control method according to Embodiment 4. As to input media data stream from the external unit shown in FIG. 7, a priority is applied from each of encoded units, and the input data own information amounts different from each other. These input data are once stored in the multiplexing buffer 2. The multiplexing control unit 4 provisionally selects such encoded units whose information amount can be transmitted from the encoded units stored in the multiplexing buffer 2, which have been received within the past unit time (time corresponding to 7 units in this drawing) every 1/M unit time (time corresponding to 1 unit in this drawing) from such encoded units having high priorities. In FIG. 7, encoded units which are not meshed are provisionally selected. Then, only the encoded units selected within the oldest 1/M unit time are notified from the multiplexing control unit 4 to the multiplexing unit 3, and in the multiplexing control unit 3, the selected data having the priority of "1" is outputted. At this time, such data which has not been selected (there is no selected data in this time) is discarded.

Further, after the 1/M unit time has passed, the multiplexing control unit 4 provisionally selects encoded units from the encoded units within the past unit time in a similar manner, and if there are such encoded units which correspond to the encoded units within the oldest 1/M unit time, then the multiplexing control unit 4 outputs the corresponding encoded units, whereas if there are encoded units which do not correspond to the encoded units within the oldest 1/M unit time, then the multiplexing control unit 4 discards the encoded units (namely, encoded unit having priority of "3" of FIG. 7).

Since the above-described multiplexing control operation is carried out, it is possible to avoid that the threshold value of the priority is suddenly changed, and this threshold value is gradually changed. As a result, the stable priority multiplexing control operation can be carried out.

As previously explained, the multiplexing control operation is carried out every 1/M unit time, so that the encoded units having the high priority can be selected and multiplexed with each other under stable condition.

Also, in Embodiment 4, the unit time and the M value during the multiplexing operation may be dynamically changed, depending upon the communication condition and the like. In the case where the output rate is restricted and the delay time occurred in the network is varied due to congestion of the network, the unit time and the M value for the multiplexing operations optimized to these conditions may be dynamically changed. For instance, when the output rate is decreased, since the encoded units which can be transmitted are decreased in number, the unit time may be increased in order that encoded units having high priorities can be firmly selected. Also, since encoded units may be rarely transmitted, the value of "M" may be reduced in order that the multiplexing control load can be decreased. It should also be noted that even in Embodiments 1 to 3, the unit times during the multiplexing operations may be dynamically changed, so that similar effects to the above-explained effect may be achieved.

As previously explained, the unit time and the value of "M" for the multiplexing operation are dynamically changed, so that the optimum multiplexing control operation can be carried out in response to the communication condition and the like.

Embodiment 5

In Embodiments 1 to 4 described above, the encoded units have been discarded which are judged as those having the lower priorities in the multiplexing control operation. In Embodiment 5, such an example is indicated that an encoded unit having a low priority is transmitted via an auxiliary transfer path.

Figure 8:
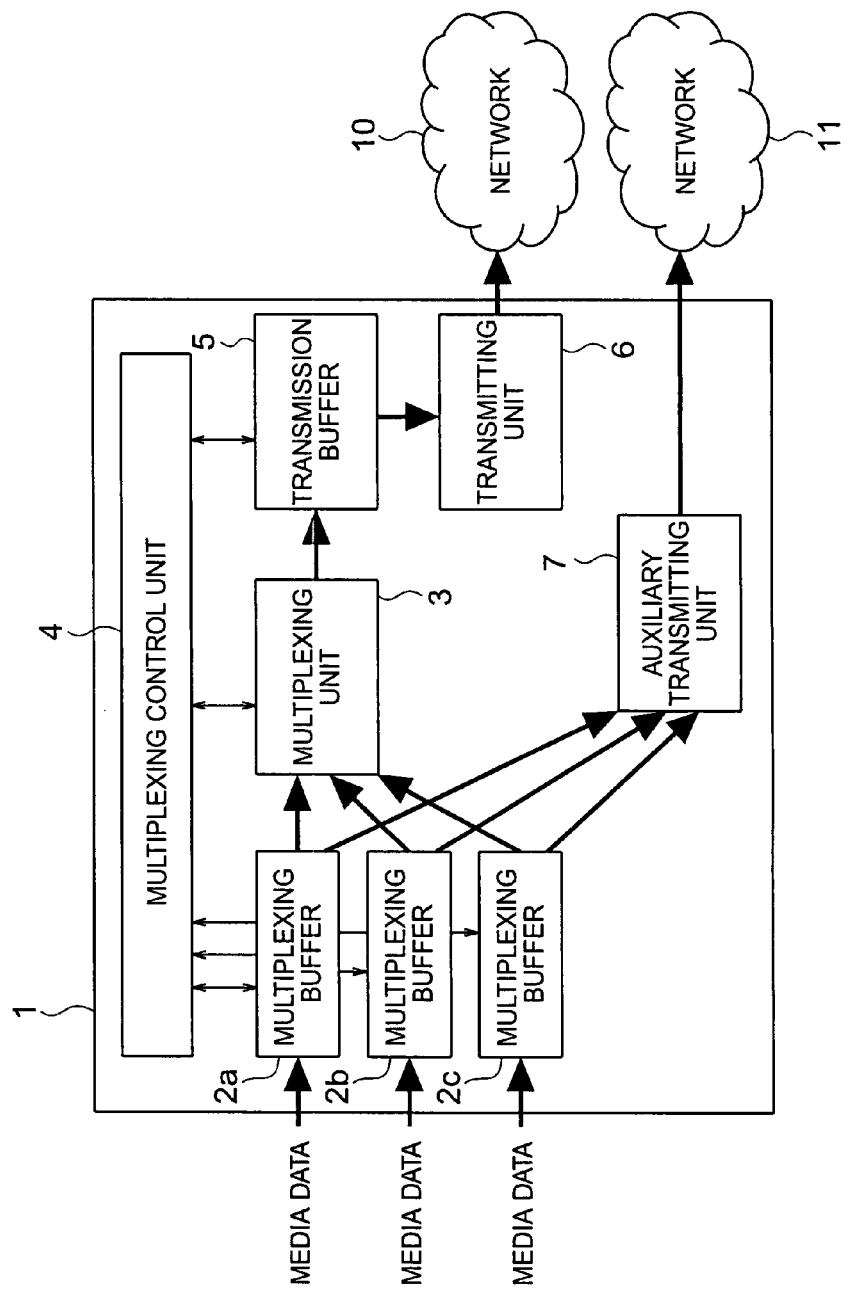
FIG. 8 is a block diagram indicating a configuration of a multiplexing apparatus according to Embodiment 5 of the present invention.

FIG. 8 is a block diagram showing a configuration of a multiplexing apparatus according to Embodiment 5 of the present invention. The multiplexing apparatus according to Embodiment 5 shown in FIG. 8 is further provided with an auxiliary transmitting unit 7 with respect to the configuration of Embodiments 3 and 4 shown in FIG. 5, while the auxiliary transmitting unit 7 transmits such encoded units stored in the multiplexing buffers 2a to 2c, which have not been selected and outputted by the multiplexing unit 3. The multiplexing apparatus outputs data to two networks 10 and 11. Since other structural units of Embodiment 5 are similar to those of Embodiments 3 and 4, explanations thereof are omitted.

Next, operations will be described. Since operations of priority multiplexing controls are identical to those of Embodiment 3 or 4, explanations thereof are omitted. Encoded units stored in the multiplexing buffers 2a to 2c, which have not been selected by the multiplexing unit 3, are transferred to the auxiliary transmitting unit 7. The auxiliary transmitting unit 7 transmits these encoded units to the network 11.

It should also be noted that although the network 10 and the network 11 are described as different networks in this example, these networks 10 and 11 may be alternatively structured as a single network. However, in this alternative case, addresses of transmissions sources, transfer protocols or parameters thereof are required to be made in such a way that a certain portions thereof are different from those which are transmitted from the transmitting unit 6.

As such data which is transmitted via the network 10 which corresponds to a major transfer path, data having a high priority may be transmitted, whereas data having a low priority may be transmitted by using the network 11 which corresponds to an auxiliary transfer path. With the above-explained data transferring operations, the data having the low priority may also be transmitted by using the auxiliary transfer path.

Figure 9:
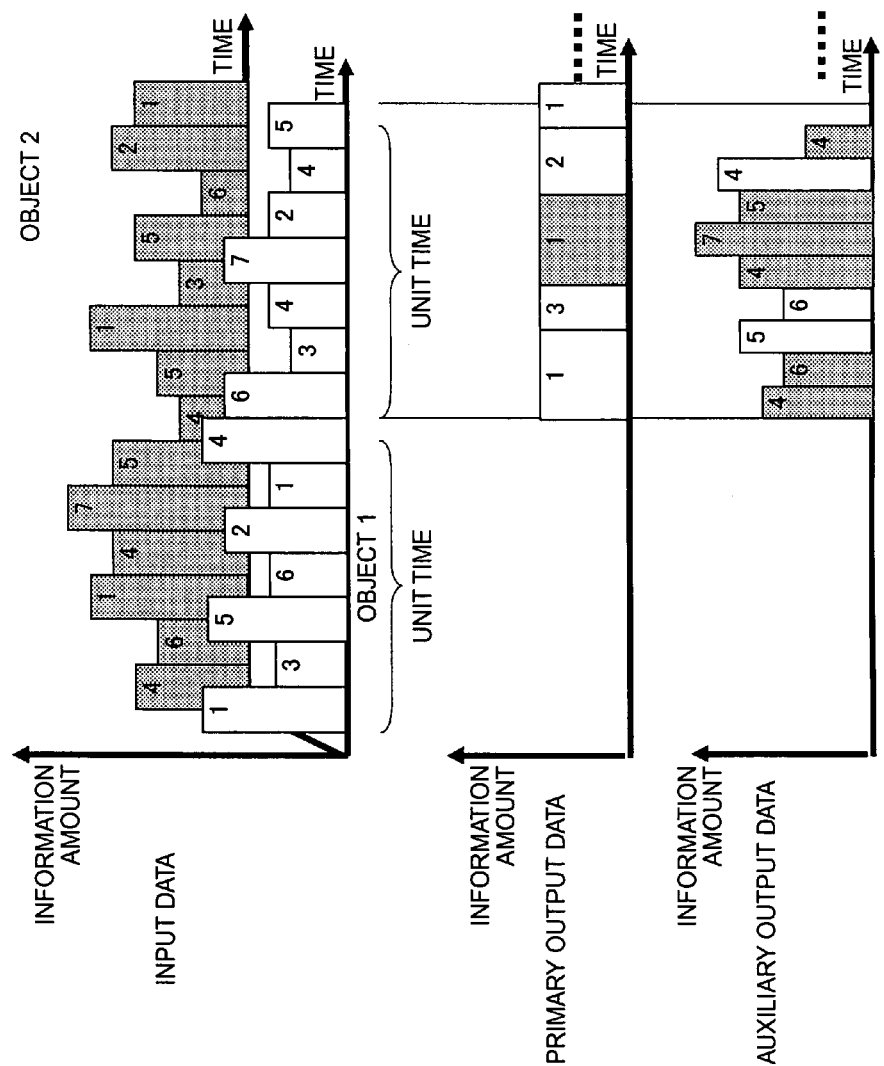
FIG. 9 is a diagram representing an example of a multiplexing control method according to Embodiment 5 of the present invention, namely indicating input data and output data.

FIG. 9 is a diagram indicating an example of a multiplexing control method according to Embodiment 5. Two sorts of input media data streams (object 1 and object 2) inputted from the external unit own different information amounts from each other, while a priority is applied to each of these encoded units. These input data are once stored in the multiplexing buffers 2a and 2b. The multiplexing control unit 4 selects such encoded units having high priorities from the encoded units stored in the multiplexing buffers 2a and 2b after a unit time has elapsed (in the drawing, time corresponding to 7 units), while the selected encoded units own such information amounts which can be transmitted. In FIG. 9, the encoded units whose priorities are 1, 2, and 3 are selected, and then, the selected encoded units are outputted by the transmitting unit 6 by setting the output rate to a constant rate. Then, the encoded units having the priorities of 4, 5, 6, and 7, which have not been selected, are outputted from the auxiliary transmitting unit 7. It should also be noted that Embodiment 5 may be similarly realized in Embodiments 1 and 2 in addition to Embodiments 3 and 4.

As previously explained, the encoded unit which is scheduled to be discarded is transmitted by employing the auxiliary transfer path, so that the data having the low priority may also be transmitted.

It should also be noted that in the multiplexing apparatus according to the above-described Embodiments 1 to 5, while the multiplexing control unit 4 may vary weights for each of the media with respect to the priorities given to the respective encoded units, the multiplexing control unit 4 may calculate priorities for multiplexing the respective encoded units, and may perform multiplexing control operation by employing the priorities for the multiplexing operation.

Embodiment 6

Embodiments 1 to 5 have explained the operations of the multiplexing apparatuses serving as the transmission side. Embodiment 6 represents an example related to a receiving apparatus.

Figure 10:
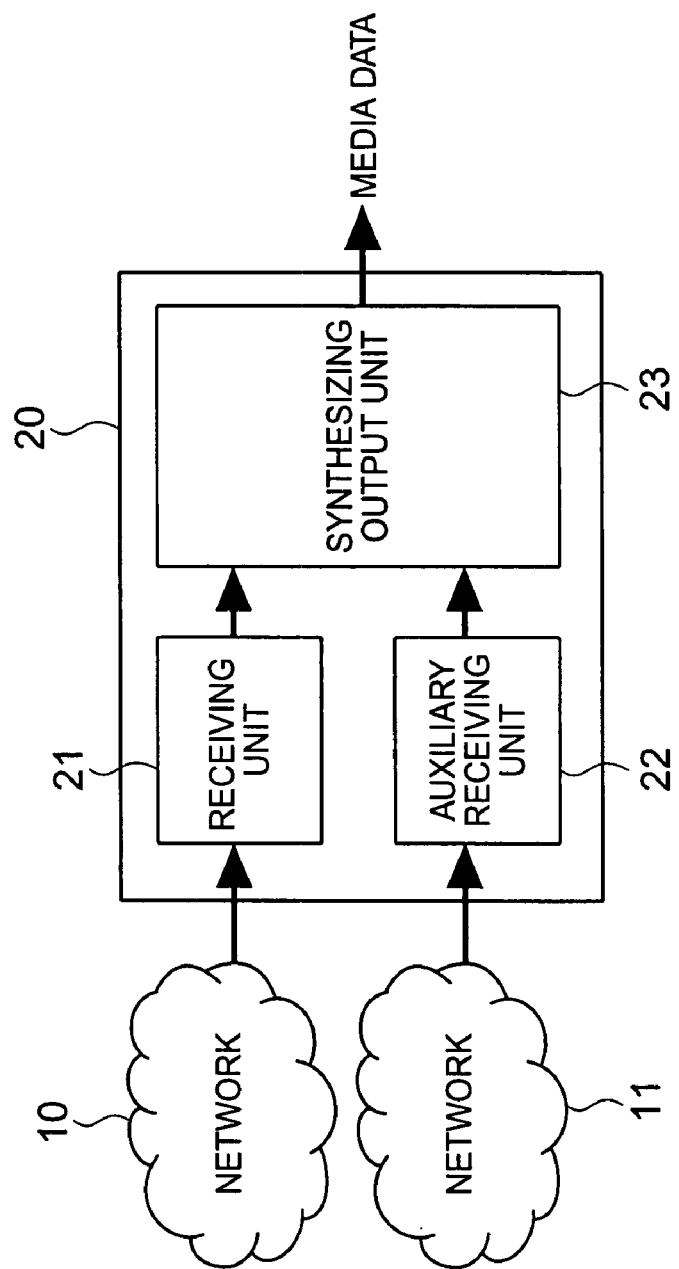
FIG. 10 is a block diagram indicating a configuration of a receiving apparatus according to Embodiment 6 of the present invention.

FIG. 10 is a block diagram showing a configuration of the receiving apparatus according to Embodiment 6 of the present invention. In FIG. 10, the receiving apparatus 20 receives data from two networks 10 and 11. The data is received by a receiving unit 21 from the network 10 which constitutes a major network. Similarly, the data is received by an auxiliary receiving unit 22 from the auxiliary network 11. A synthesizing output unit 23 synthesizes the data transferred from the receiving unit 21 with the data transferred from the auxiliary receiving unit 22 in a time sequential manner, and thereafter, outputs the synthesized data.

Next, operations will be described. Data selected in accordance with a priority is received via the network 10 by the receiving unit 21. The received data is immediately transferred to the synthesizing output unit 23. On the other hand, data which has not been selected based upon a priority thereof is received via the network 11 having an auxiliary network by the auxiliary receiving unit 22 to be transferred to the synthesizing output unit 23. The synthesizing output unit 23 synthesizes the data transferred from the receiving unit 21 and the auxiliary receiving unit 22 with each other, and arrays encoded units in the original time sequential order to output the arrayed encoded units.

If a receiving apparatus is provided with no auxiliary receiving unit, or cannot receive the data from the network 11, then only the data from the receiving unit 21 is outputted.

With employment of the above-explained configuration, all of data which can be received can be outputted in a time sequential manner, and media data can be decoded in the time sequential order by a decoder (not shown) provided subsequent to the synthesizing output unit 23.

As previously explained, the auxiliary receiving unit is provided in order that the encoded units which are scheduled to be discarded can also be received, so that the data having the low priorities can also be received.

As the method for arraying the encoded units in the original time sequential order by the synthesizing output unit 23, time instant information belonging to the encoded units may be used. Although there is such a case that this time instant information has been embedded in an encoded data, or there is another case where this time instant information is attached outside the encoded data when the encoded data is transferred, if the respective encoded units are rearrayed in the older time instant order, then the encoded unit stream may be correctly arrayed in the time sequential order.

As previously explained, the time instant information belonging to the encoded units is employed, so that the encoded units can be correctly arrayed in the time sequential order.

As another method, order information belonging to an encoded unit may be alternatively used. In this case, order information corresponds to such a number which is incremented so as to indicate an order of data. There is such a case that this order information has been embedded in an encoded data, or there is another case where this order information is attached outside the encoded data when the encoded data is transferred. If the encoded units are rearrayed in the order of a small sequential number, then the encoded unit stream may be correctly arrayed in the original time sequential order.

As previously explained, the time instant information belonging to the encoded units is employed, so that the encoded units can be correctly arrayed in the time sequential order.

While such an example that one medium data is synthesized has been explained, another case is indicated in which a plurality of media data are transmitted at the same time. For example, as explained in Embodiment 5, when the multiplexing apparatus for transmitting the plurality of media data is employed, a plurality of media data are also present in the data received by the receiving unit 21 and the auxiliary receiving unit 22 of the receiving apparatus 20. These data are rearrayed by the synthesizing output unit 23 in a time sequential manner. Then, the data arrayed in the time sequential manner are subsequently classified for each of the media, and the classified data are outputted respectively. As explained above, the data classified for each of the media can be decoded.

Figure 11:
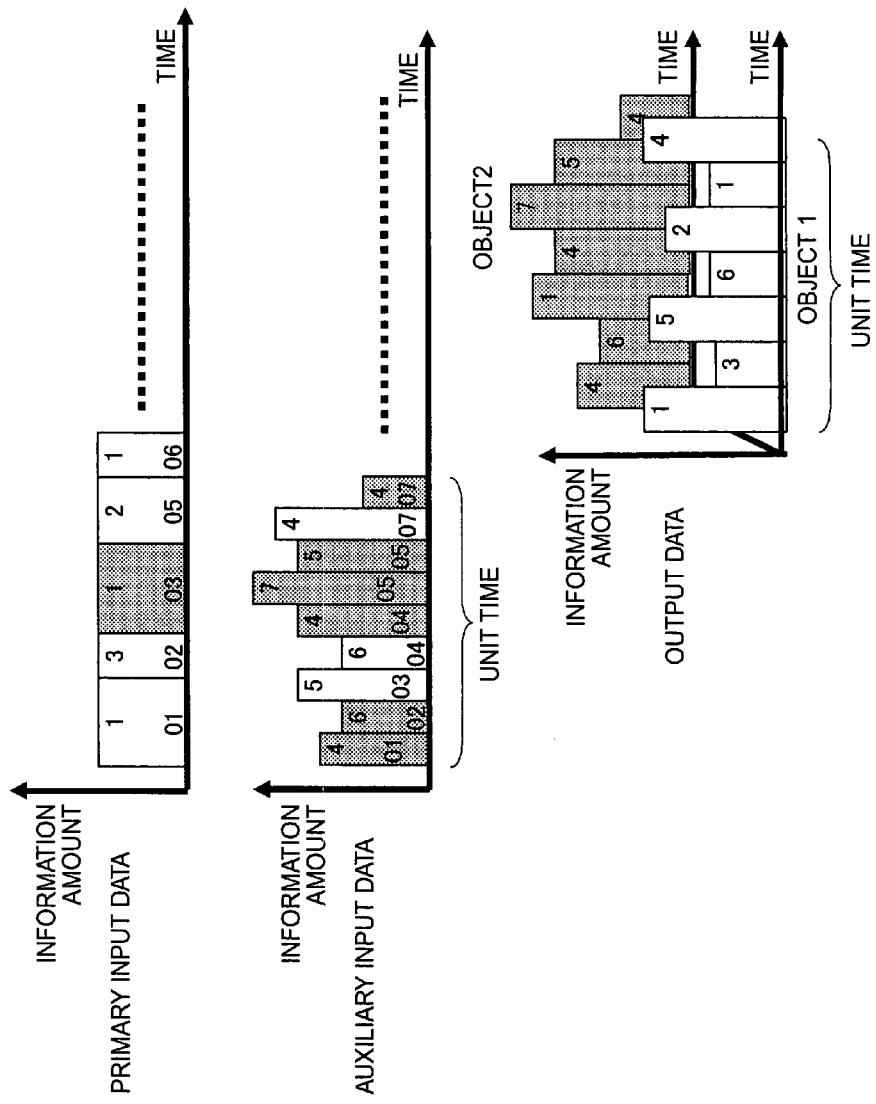
FIG. 11 is a diagram representing an example of a synthesizing process operation in receiving operation of the receiving apparatus according to Embodiment 6 of the present invention.

FIG. 11 is a diagram representing an example of a synthesizing process operation in a reception of the receiving apparatus according to Embodiment 6. When two sorts of data of the major input and the auxiliary input are received, time instant information or order information has been applied to each of the encoded units every media. FIG. 11 indicates such an example that the order information from "01" to "07" have been attached.

In the synthesizing output unit 23, the data are divided for each of the media sorts (which have been divided in colors in this case), and further, these colored data are arrayed in the order of the sequential number. Then, when the encoded units are outputted in a periodic manner, these encoded units are outputted as represented in this drawing, and may be outputted in the order of the time instant for each of the objects.

For instance, in the case where the encoded units are multiplexed in accordance with the MPEG-2 system (ISO/IEC 13818-1), the respective objects are identified based upon a PID of a TS packet, or "stream id" of a PES packet, and a time sequence of these encoded objects can be recognized based upon a time stamp (PTS and DTS) of PES.

As previously described, since the function capable of separating the encoded units for each of the media is applied to the synthesizing output unit, the encoded unit streams separated for each of the media can be outputted.

The invention claimed is:

1. A multiplexing apparatus, comprising:
   at least one multiplexing buffer for inputting thereinto encoded units to which priorities have been added to temporarily store thereinto the inputted encoded units;
   a multiplexing control device for selecting, for each unit time, encoded units which have data amounts which collectively can be transmitted within the unit time according to a total data amount set for the unit time, the multiplexing control device selecting the encoded units in order of priority based upon both the priorities and data amounts of the encoded units;
   a multiplexing device for multiplexing the selected encoded units based upon the control from the multiplexing control device to output the multiplexed encoded units for transmission by a transmitting device within the unit time, the non-selected encoded units for the unit time being rejected for transmission by the transmitting device; and
   a transmission buffer for temporarily storing an output of the multiplexing device; and
   a transmitting device for transmitting data stored in the transmission buffer at an arbitrary timing,
   wherein the multiplexing apparatus receives as input a plurality of encoded units of a same media type to which different priorities have been added, the multiplexing control unit considering the different priorities of the encoded units of the same media type when selecting the encoded units to be multiplexed by the multiplexing device, and
   wherein the multiplexing control device provisionally selects the encoded units received for the unit time in the multiplexing buffer every 1/M unit time in order of priority based upon the priorities and the data amount of the encoded units in such a manner that a remaining buffer amount of the transmission buffer is in the vicinity of a certain threshold value, and outputs to the transmission buffer only the provisionally selected encoded units which are contained in the oldest 1/M unit time within the unit time, where M is an integer larger than or equal to 1.

2. The multiplexing apparatus according to claim 1, wherein:
   the at least one multiplexing buffer includes a plurality of multiplexing buffers for storing thereinto a plurality of sorts of data streams in a separate manner, which are structured of the encoded units to which the priorities have been applied; and
   the multiplexing device multiplexes the selected encoded units from the encoded units stored in the plurality of multiplexing buffers based upon the control from the multiplexing control device to output the multiplexed encoded unit.

3. The multiplexing apparatus according to claim 2, further comprising:
  a transmission buffer for temporarily storing thereinto the output of the multiplexing device; and
  a transmitting device for transmitting data stored in the transmission buffer at an arbitrary timing,
  wherein the multiplexing control device selects the encoded units in order of priority based upon the priorities and the data amount of the encoded units in such a manner that a remaining buffer amount of the transmission buffer becomes larger than the data amount which can be transmitted within the unit time.

4. The multiplexing apparatus according to claim 3, wherein the multiplexing control device selects the encoded units in order of priority based upon the priorities and the data amount of the encoded units in such a manner that a remaining buffer amount of the transmission buffer is in the vicinity of such a data amount "N" times larger than the data amount which can be transmitted within the unit time, where N is a real number larger than 1.

5. The multiplexing apparatus according to claim 3, wherein the multiplexing control device selects the encoded units in order of priority based upon the priorities and the data amount of the encoded units in such a manner that a level of the lowest priority of an encoded unit to be selected becomes stable, where a threshold value of the remaining buffer amount of the transmission buffer is varied to be increased and decreased.

6. The multiplexing apparatus according to claim 4, wherein the multiplexing control device selects the encoded units in order of priority based upon the priorities and the data amount of the encoded units in such a manner that a level of the lowest priority of an encoded unit to be selected becomes stable, where a threshold value of the remaining buffer amount of the transmission buffer is varied to be increased and decreased.

7. The multiplexing apparatus according to claim 1, wherein the multiplexing control device dynamically varies an M value.

8. The multiplexing apparatus according to claim 1, wherein the multiplexing control device dynamically varies the unit time during multiplexing operation.

9. The multiplexing apparatus according to claim 2, wherein the multiplexing control device varies weighting operations every media with respect to the priorities applied to the respective encoded units, and at the same time, calculates priorities of the respective encoded units for multiplexing operations, and performs multiplexing control operations by employing the calculated priorities for the multiplexing operations.

10. The multiplexing apparatus according to claim 1, further comprising an auxiliary transmitting device for transmitting an encoded unit stored in the multiplexing buffer, which has not been selected to be transmitted by the transmitting device.

11. A method implemented in a multiplexing apparatus, comprising:
  inputting encoded units to which priorities have been added;
  temporarily storing the inputted encoded units into at least one multiplexing buffer of the apparatus;
  selecting for each unit time, encoded units which have data amounts which collectively can be transmitted within the unit time according to a total data amount set for the unit time, wherein the selection of the encoded units is performed in order of priority based upon both the priorities and data amounts of the encoded units;
  multiplexing the selected encoded units for transmission by a transmitting device within the unit time, the non-selected encoded units for the unit time being rejected for transmission by the transmitting device;
  temporarily storing the multiplexed encoded units in a transmission buffer of the apparatus; and
  transmitting data stored in the transmission buffer at an arbitrary timing via the network, and
  transmitting by the transmitting device multiplexed encoded units stored in the transmission buffer at an arbitrary timing from the apparatus via a network,
  wherein the multiplexing apparatus receives as input a plurality of encoded units of a same media type to which different priorities have been added, and the different priorities of the encoded units of the same media type are considered when selecting the encoded units to be multiplexed by the multiplexing device, and
  wherein the selecting step includes:
    provisionally selecting the encoded units received for the unit time in the multiplexing buffer every 1/M unit time in order of priority based upon the priorities and the data amount of the encoded units in such a manner that a remaining buffer amount of the transmission buffer is in the vicinity of a certain threshold value, and
    outputting to the transmission buffer, only the provisionally selected encoded units which are contained in the oldest 1/M unit time within the unit time, where M is an integer larger than or equal to 1.

12. The method according to claim 11, wherein:
the at least one multiplexing buffer includes a plurality of multiplexing buffers,
the temporarily storing step stores a plurality of sorts of data streams in a separate manner, the data streams comprising the encoded units to which the priorities have been applied; and
the multiplexing step multiplexes the selected encoded units from the encoded units stored in the plurality of multiplexing buffers.

13. The method according to claim 11, further comprising transmitting an encoded unit stored in the multiplexing buffer, which has not been selected by the selecting step for transmission by the transmitting device, via an auxiliary network.

* * * * *